8720X

L. Crane.

Spinning Flyer.

Patented Mar. 26, 1835.

N. PETERS, PHOTO-LITHOGRAPHER, WASHINGTON, D. C.

8720X

L. CRANE.

FLIER.

Patented Mar. 26, 1835.

Fig. 1.

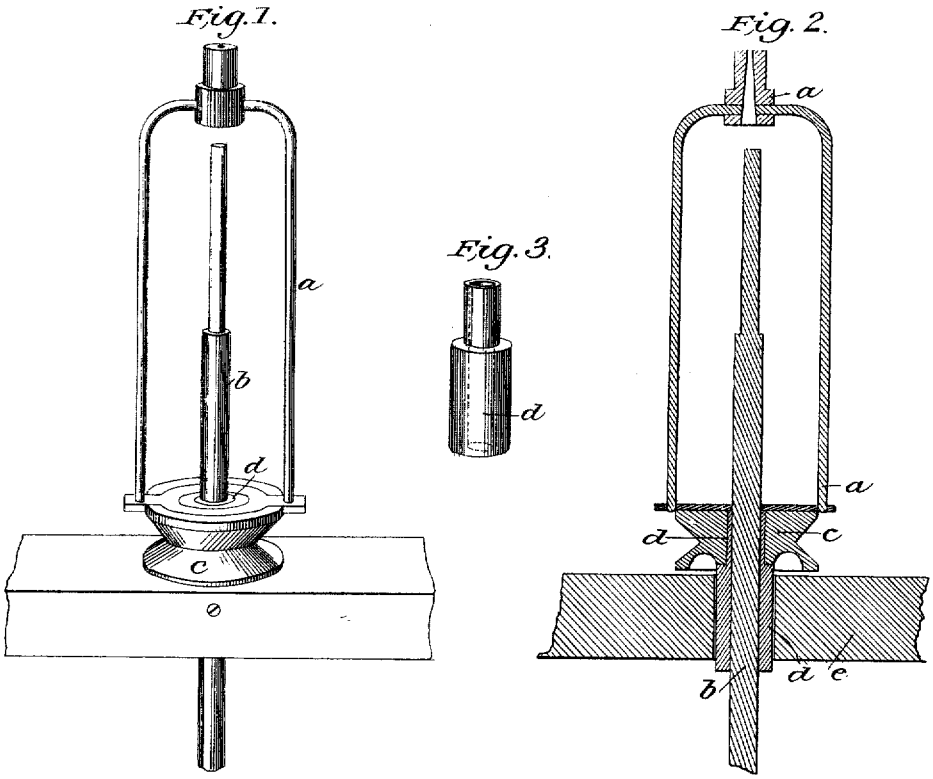

Fig. 3.

Fig. 2.

References.

Figure 1:
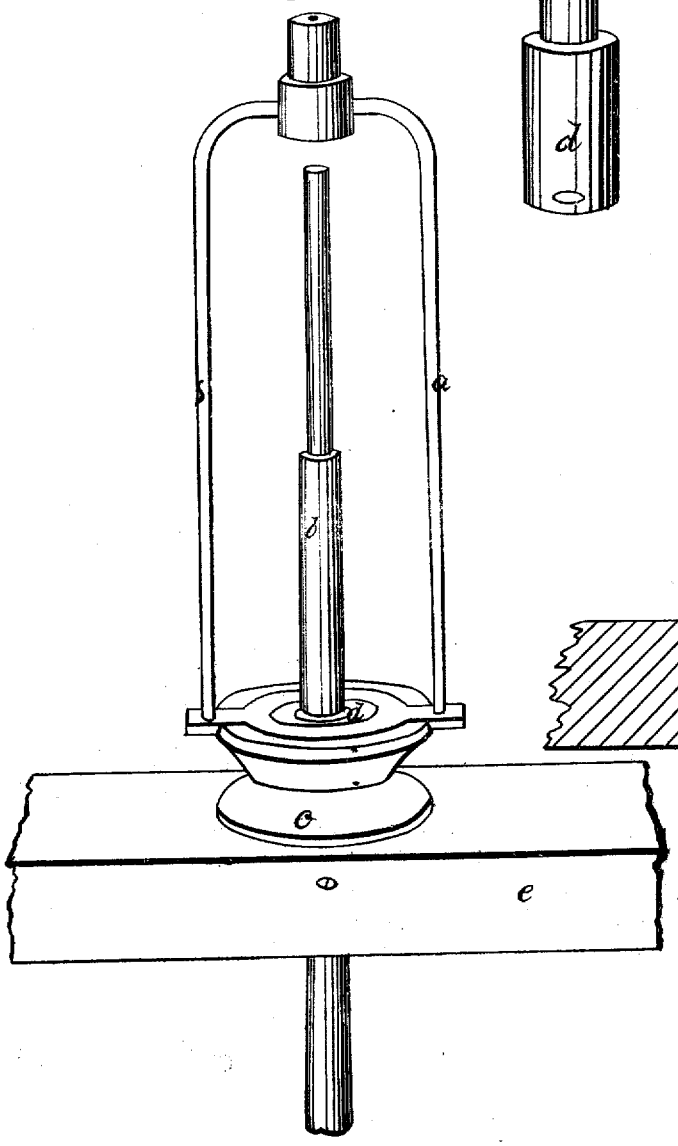
Figure 3:
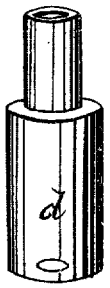
Figure 2:
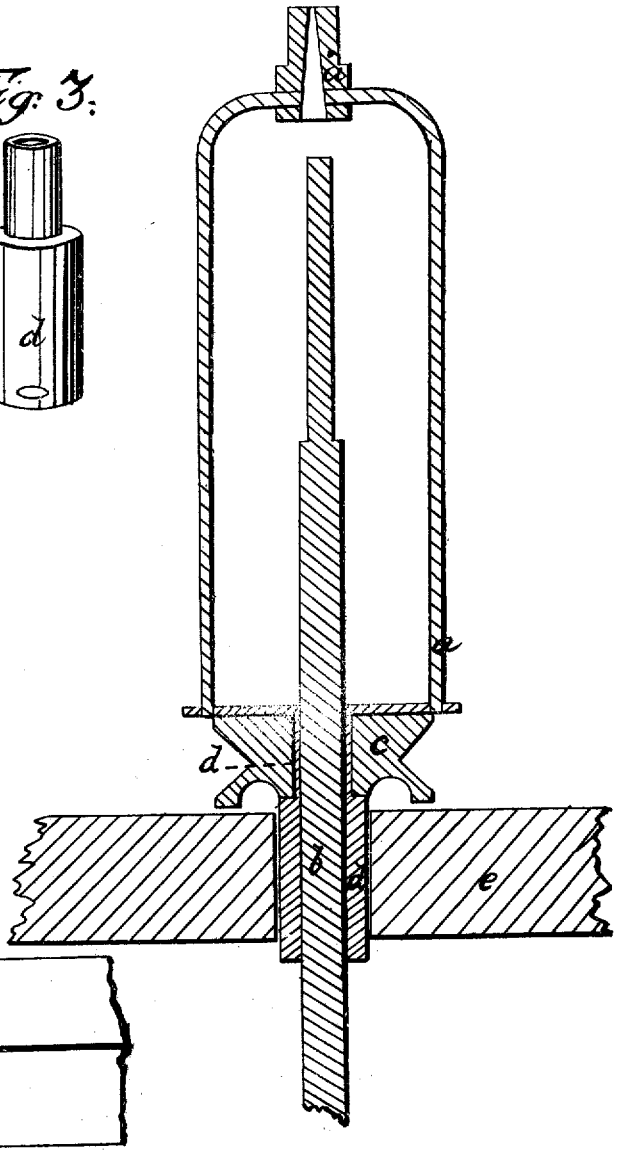

Fig. 1. Perspective view of the Flyer whurr and the top of the tube through which the spindle passes. Fig. 2 a section Fig. 3. The tube a The Flyer b spindle. c whurr d tube. e supporting rail Patent Office 4th Aug 1838

Made under the direction of the Commission
of Patents in conformity with act 3d March 1837

Henry L Ellsworth
Commissioner of Patents

THE NORRIS PETERS CO., PHOTO-LITHO., WASHINGTON, D. C.

8720X
3/26/1835

Luther Crane.
Letters Patent

The schedule referred to in these Letters Patent and making part of the same containing a description in the words of the said Luther Crane himself of his improvement in manufacturing Cotton into yarn, Be it known that I Luther Crane have invented constructed made and applied to use, a new and useful improvement in the mode of making or manufacturing Cotton into yarn.

The invention or improvement consists in the addition of a tube to a part of the machine now in use for the spinning or making Cotton yarn. A model of that part of the machine to which this improvement is attached accompanies the petition. Without the improvement this part of the machine consists of a Spindle a Whirl and flyer; the spindle is fastened to a [illegible] traverse rail at one end and passes through the whirl. The whirl turns upon the Spindle. It is necessary that the spindle should pass up and down through the whirl by the motion of the traverse rail to which it is attached.

The whirl moves on the Spindle and gives to the Spindle a tremulous motion which injures the operation of the machine. To prevent this motion and to enable the machine to be operated with more rapidity, this tube is introduced into the machine. The tube is firmly attached to a plate of iron or wood. The spindle passes up and down through the tube and the whirl turns upon the tube without affecting the Spindle the tube being firmly fixed and receiving the motion of the whirl the tremulous motion of the spindle is prevented by the introduction of the tube. In testimony that the above is a true specification of my said improvement as above described I have hereto set my hand and seal this Eighteenth day of February in the Year of our Lord one thousand eight hundred and twenty five Luther Crane {S.S.}

Witnesses. Joseph Cummings Jr
Joseph Cummings

3

(1[illegible] Words) Patented March 26. 1825.

(Drawing)